W. J. BEAGLE.
GLARE SHIELD FOR MOTOR VEHICLES.
APPLICATION FILED FEB. 24, 1921.
1,411,399.   Patented Apr. 4, 1922.
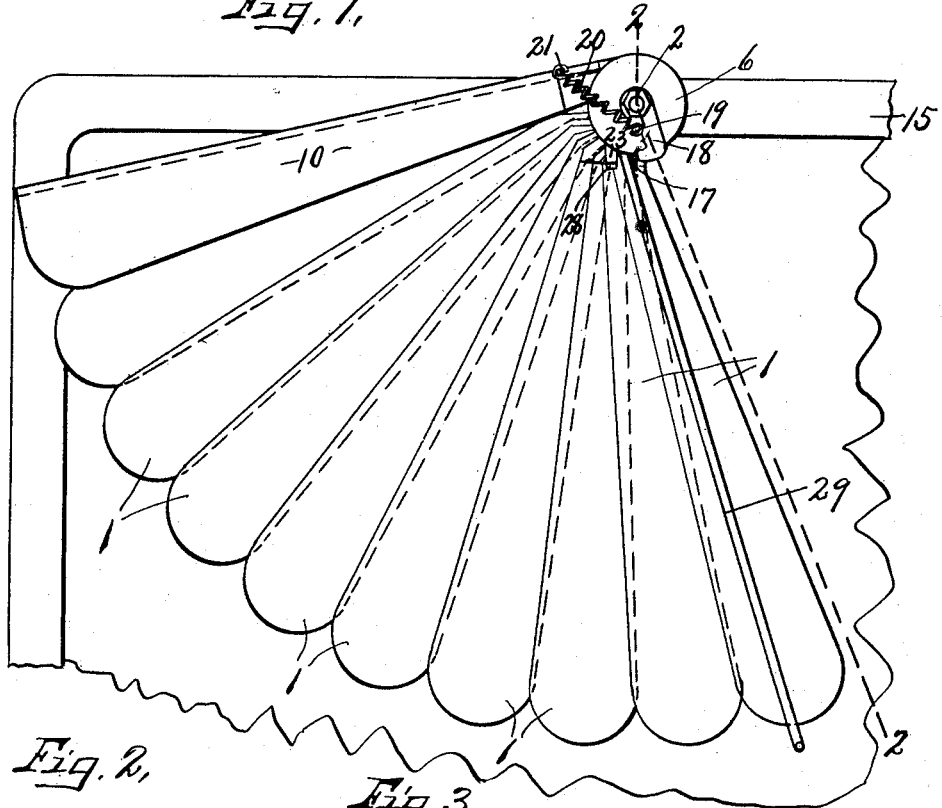
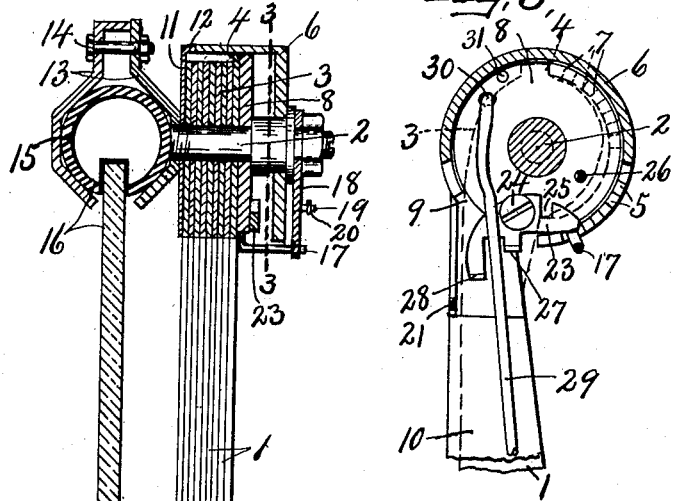
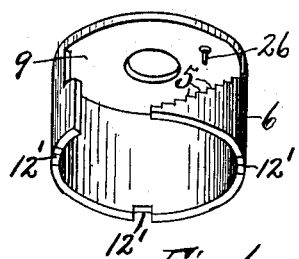
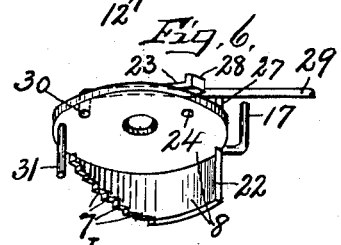
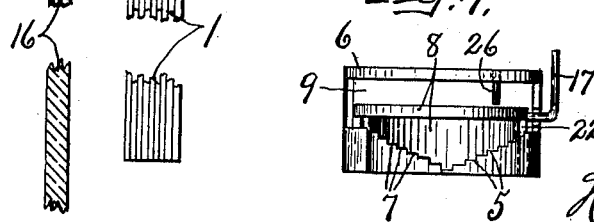
INVENTOR
W. J. Beagle
BY
Howard P. Denison
ATTORNEY.

UNITED STATES PATENT OFFICE.

WILLIAM J. BEAGLE, OF SYRACUSE, NEW YORK, ASSIGNOR OF ONE-HALF TO JOHN M. STEVER, OF SYRACUSE, NEW YORK.

GLARE SHIELD FOR MOTOR VEHICLES.

1,411,399.     Specification of Letters Patent.     Patented Apr. 4, 1922.

Application filed February 24, 1921. Serial No. 447,493.

*To all whom it may concern:*

Be it known that I, WILLIAM J. BEAGLE, of Syracuse, in the county of Onondaga, in the State of New York, have invented new and useful Improvements in Glare Shields for Motor Vehicles, of which the following, taken in connection with the accompanying drawings, is a full, clear, and exact description.

This invention relates to certain improvements in glare shields for motor vehicles adapted to be mounted upon the windshield frame or other suitable support directly in front of the driver for intercepting and subduing the rays from the head-lights of an approaching machine without obscuring the vision of the driver through the ray-intercepting medium.

The main object is to provide a device of this character, which may be easily and quickly extended across a considerable area of the wind-shield glass directly in front of the driver, and locked in its extended position, or may be instantly released and automatically collapsed into a relatively small compact space, wholly to one side of the forward line of vision of the driver.

Another object is to provide a protective housing for the light intercepting medium when not in use, and to equip said housing with means whereby it may be readily clamped to a portion of the frame of the wind-shield.

One of the specific objects is to provide a device of this character in the form of a folding fan composed of a series of blades of light, transparent material, such as celluloid colored to subdue the light without reducing their transparency, arranged side by side in juxtaposed relation to swing about a common axis to different radial positions.

Another specific object is to provide relatively movable stepped members for successively advancing the blades to different radial positions and for stopping them in said positions.

A further object is to provide the movable member with means for returning the blades to their normal position within the housing and to cause said member to be turned automatically when its locking means is released.

Other objects and uses relating to the specific device will be brought out in the following description:

In the drawings:

Fig. 1 is an inner face view of a glare shield embodying the various features of my invention as extended for use.

Fig. 2 is a transverse sectional view, partly broken away, of the same device with the blade in an open position out of the housing, and also showing the means for clamping the device to the frame of the windshield, a portion of which is shown in section.

Fig. 3 is a transverse sectional view taken on line 3—3, Fig. 2 showing more particularly the operating means and locking means for the rotatable blade-operating member, and also the stepped abutments for limiting the opening movement of the blade, the greater portion of the housing or blade being broken away.

Fig. 4 is a side elevation of the stationary and rotary drum in their assembled relation showing the stepped shoulders and abutments for advancing and limiting the movement of the blade.

Figs. 5 and 6 are perspective views of the stationary drum and rotary drum, respectively.

As illustrated, this device comprises a series of, in this instance nine, transparent blades —1— of substantially the same form and size preferably mounted near one end upon a pivotal stud or pin —2— in juxtaposed relation side by side to swing about a common axis from a normal position in substantially a radial plane to different radial planes one in advance of the other, said blades being preferably made of thin, flat, plates of celluloid or equivalent material suitably colored to subdue the reflected rays from the head-light or lights of an approaching machine without materially reducing their transparency.

The pivotal ends of the blades are enlarged radially to form circular heads —3— which are provided with relatively short radial arms —4— at one side of the pivot —2— opposite the longer arms, the latter being more or less tangential to the head —3— and gradually increasing in width from said head to their outer ends to permit them to overlap slightly when extended for use.

These blades are of sufficient length and width to cover a relatively wide field of vision of the driver when properly adjusted and extended. The portions of the blades —1— at the junction of the longer arm with the head —3— are relatively narrow and are adapted to cooperate with a series of stepped abutments —5— for limiting their opening movement, said abutments being arranged in a circular row concentric with the axis of the pivotal pin —2—, and are preferably formed upon a relatively stationary circular case —6—, which is also concentric with the axis of the pivot —2— and forms a partial housing for the head —3—.

The short radial arms —4— are adapted to be successively engaged by a series of stepped abutments —7— which are arranged in a circular row concentric with the axis of the pivot —2— and preferably upon the edge of the periphery wall of a rotary drum —8—, the latter being mounted upon the pivotal pin —2— within the housing —6—, as shown clearly in Fig. 4.

The periphery wall of the housing or drum —6— upon which the stepped abutments or shoulders —5— are formed, has a portion of one side cut away at —9— to form an opening therethrough extending circumferentially in one direction from the stepped abutments or shoulders —5— a sufficient length to permit the reception and operation of the blades therein through an arc of substantially 90 degrees.

The longer arms of the blades are normally collapsed with the housing —10— which is —U— shaped in cross section to permit the blade to pass through the open side thereof and to lie edgewise against the closed side when not in use, said housing —10— having a circular head —11— mounted upon the pivotal stud or pin —2— and forming one side of the circular housing or drum —6—.

The front side of the housing —10— is secured by rivets or other suitable fastening means to one of the sections of a clamp —13—, having a bolt —14— by which it may be clamped to a portion of the frame —15— of a wind-shield —16— in such manner as to support the housing —10— in a substantially horizontal position nearly in the plane of the top rail of said wind-shield frame so as not to obstruct the vision of the driver when the blades are collapsed in said housing.

The housing sections —4— and —10— are secured to each other and to the clamping member —13— by means of the pivotal bolt —2—, and are additionally held against relative rotation by means of lugs —12— on the section —10— or rather upon the head —11— thereof engaged in notches or recesses —12'— in the front edge of the periphery wall of the drum —6—.

The blade operating drum —8— is journaled upon the pivotal end of the stud —2— and is provided with an angular lug —17— projecting radially therefrom through the opening —9— in the drum —6— and extending axially across the inner end of said drum for engagement by a dog —18—, which is also pivotally mounted upon the rear end of the pivotal stud —2— to swing about the axis thereof.

The dog —18— is provided with a lug —19— for receiving one end of a retracting spring —20— having its other end connected to a lug —21— on the housing section —10— for automatically collapsing the blades within said housing section and yieldingly holding them in that position.

The greater portion of the peripheral wall —8— is cut away to form an axially extending shoulder —22—, which extends across the adjacent edges of all of the blades —1— for forcing and holding them into the housing section —10— when the drum —8— is retracted by the spring —20—, the radially projecting portion of the lug —17— also serving as a limiting stop cooperating with one of the end walls of the opening —9— in the housing section —6— to limit the opening movement of the blades.

A pawl or detent —23— is pivoted at —24— to the rear end wall of the rotary drum —8—, and is provided with a notch —25— for interlocking engagement with a pin or stud —26— on the rear end wall of the drum or housing section —6— for holding the blade in extended or open position. The heel of the pawl —23— is provided with a pair of lugs —27— and —28— in spaced relation circumferentially of the pivotal pin —24—, and at unequal distances from the axis thereof, as shown in Fig. 3, for receiving between them the adjacent portion of a hand lever —29—.

The rear end walls of the drums —6— and —8— are spaced a short distance apart axially to permit the free operation of the pawl —23— and lever —29—. The lever —29— is pivoted at one end at —30— to the rear end of the drum —8— and extends outwardly through the opening —9— and across the heel of the pawl —23— between the lugs —27— and —28— for engagement therewith, the outer end of said lever being extended practically the full length of the blades —1— to form a handle by which it may be operated to rotate the drum —8— against the action of the retracting spring —20—.

The stepped abutments —5— correspond in number and in axial depth to the number and thickness of the blades —1— and are sequentially disposed in the planes of movement of their respective blades for limiting their opening movement to different radial positions so that when extended, the adjacent edges of the blades will slightly overlap and thereby form a practically continuous glare-intercepting and light-subduing medium through an arc of approximately 90 degrees and the full length of the blades outside of the drums —6— and —8—.

In reverse manner, the stepped shoulders

—7— are disposed in the planes of movement of their respective blades for opening the latter sequentially from one side to the other side of the series.

As illustrated, the shoulders —7— are progressively stepped toward the front of the machine from the forward end of the series in the direction of rotation to successively engage the radial arms —4— of the blades from the rear toward the front side of the series, thereby progressively advancing the longer arms of the blades from the rear side toward the front side of said series as the drum —8— is rotated by the hand-lever —29— through the medium of the lugs —27— and —28— of the pawl —23—.

That is, if the drum —8— is rotated by the hand-lever —29—, the first step of the series —7— engages the arm —4— of the rearmost blade —1— to move the same through an arc of approximately 90 degrees, the next step engaging the second blade from the rear to move it through an arc of slightly less length corresponding approximately to the width of the blade, the remaining blades being shifted through corresponding lesser arcs by the remaining shoulders, the movement of said blades being progressively limited by the stop shoulders —5— or abutments on the drum —6—.

When all of the blades are extended in the manner just described, the pawl —23— will have been brought to a position to interlock with the pin —26— for holding the drum —8— and blades against return movement but as soon as it is desired to return the blades to their collapsed or closed positions within the housing —10—, it is simply necessary to push the free end of the lever —29— toward its normal position, thereby causing it to engage the lug —28— to trip the pawl —23— from its holding engagement with the lug —26—, whereupon the spring —20— will automatically return the drum —8— and blades together with pawl —23— and operating lever —29— to their normal positions, it being understood that the edges of the blades adjacent the shoulder —22— will be engaged by said shoulder and successively returned as the drum —8— is actuated by the spring.

A post —31— is secured to the end wall of the drum —8— to ride against the head —11—, and thereby to assist in supporting said drum against vibratory movement on its pivotal pin or stud —2—.

The operation of my invention will now be readily understood upon reference of the foregoing description and the accompanying drawing, and it is evident that various changes may be made in the detail construction and arrangement of the parts of the blade-operating mechanism without departing from the spirit of this invention, and therefore, I do not wish to limit myself to the precise construction shown and described.

What I claim is:

1. In a glare shield of the character described, a series of transparent glare-subduing blades hinged to swing about a common axis, and a rotary member coaxial with said axis and provided with stepped shoulders for successively engaging and operating the blades from a normal folded position to an unfolded position.

2. In a glare shield of the character described, a series of transparent light-subduing blades normally folded side by side and hinged to swing about a common axis, an operating member movable relatively to said blades and provided with stepped shoulders for successively engaging the blades and shifting them from their normal position.

3. In a glare shield of the character described, a series of transparent light-subduing blades normally folded side by side and hinged to swing about a common axis, an operating member movable relatively to said blades and provided with stepped shoulders for successively engaging the blades and shifting them from their normal position, and retracting means for said operating member.

4. In a glare shield of the character described, a series of transparent light-subduing blades foldable one upon the other, an operating member having stepped shoulders for successively engaging and unfolding the blades when said member is moved in one direction, and an additional member having stepped abutments disposed in the planes of movement of the blades for limiting their opening movement.

5. In a glare shield of the character described, a series of transparent light-subduing blades foldable one upon the other, an operating member having stepped shoulders for successively engaging and unfolding the blades when said member is moved in one direction, and an additional member having stepped abutments disposed in the planes of movement of the blades for limiting and opening movement, and means for retracting the operating member, said operating member having means for engaging and returning the blades to their folded positions.

In witness whereof I have hereunto set my hand this 18th day of February, 1921.

WILLIAM J. BEAGLE.

Witnesses:
H. E. CHASE,
M. R. COOKE.